US005779853A

United States Patent [19]

Cline

[11] Patent Number: 5,779,853

[45] Date of Patent: Jul. 14, 1998

[54] HOLE-FILLING TOOL

[76] Inventor: Amos E. Cline, Box 143, Cross Rd., Costigan, Me. 04423

[21] Appl. No.: 543,209

[22] Filed: Oct. 13, 1995

[51] Int. Cl.[6] ........................ B32B 31/00

[52] U.S. Cl. ........................ 156/578; 156/94; 222/235

[58] Field of Search ........................ 156/94, 578; 222/235, 222/280, 236, 391

[56] References Cited

U.S. PATENT DOCUMENTS

| | | | |
|---|---|---|---|
| 1,882,651 | 10/1932 | Davis | 222/235 |
| 2,040,126 | 5/1936 | Grieve | 156/94 X |
| 4,390,115 | 6/1983 | Bigham | 222/83.5 |
| 4,952,257 | 8/1990 | Forler | 156/94 |
| 4,957,223 | 9/1990 | Beilush | 222/236 X |
| 4,979,649 | 12/1990 | Wescott | 222/392 X |
| 5,155,965 | 10/1992 | Tabei et al. | |
| 5,221,348 | 6/1993 | Masano | 156/578 X |
| 5,257,486 | 11/1993 | Holmwall . | |
| 5,302,205 | 4/1994 | Priddy . | |

*Primary Examiner*—James Engel

*Attorney, Agent, or Firm*—Chris A. Caseiro; Thomas L. Bohan

[57] ABSTRACT

A hole-filling tool designed for compacting a material into holes in wood. The hole-filling tool includes a tube, a plunger, and operating means for aligning and operating the tube and plunger. The tube is thin-walled to allow the user to align the tool properly over the hole. The plunger slides within the tube and forces material therein into the hole to be filled. The hole-filling tool may include a handle and trigger for simplified use of the tool and a loader for packing a sawdust-adhesive-thinner filler material into the tube. The hole-filling tool may also include an automatic filler material feeder, such as an auger.

14 Claims, 5 Drawing Sheets

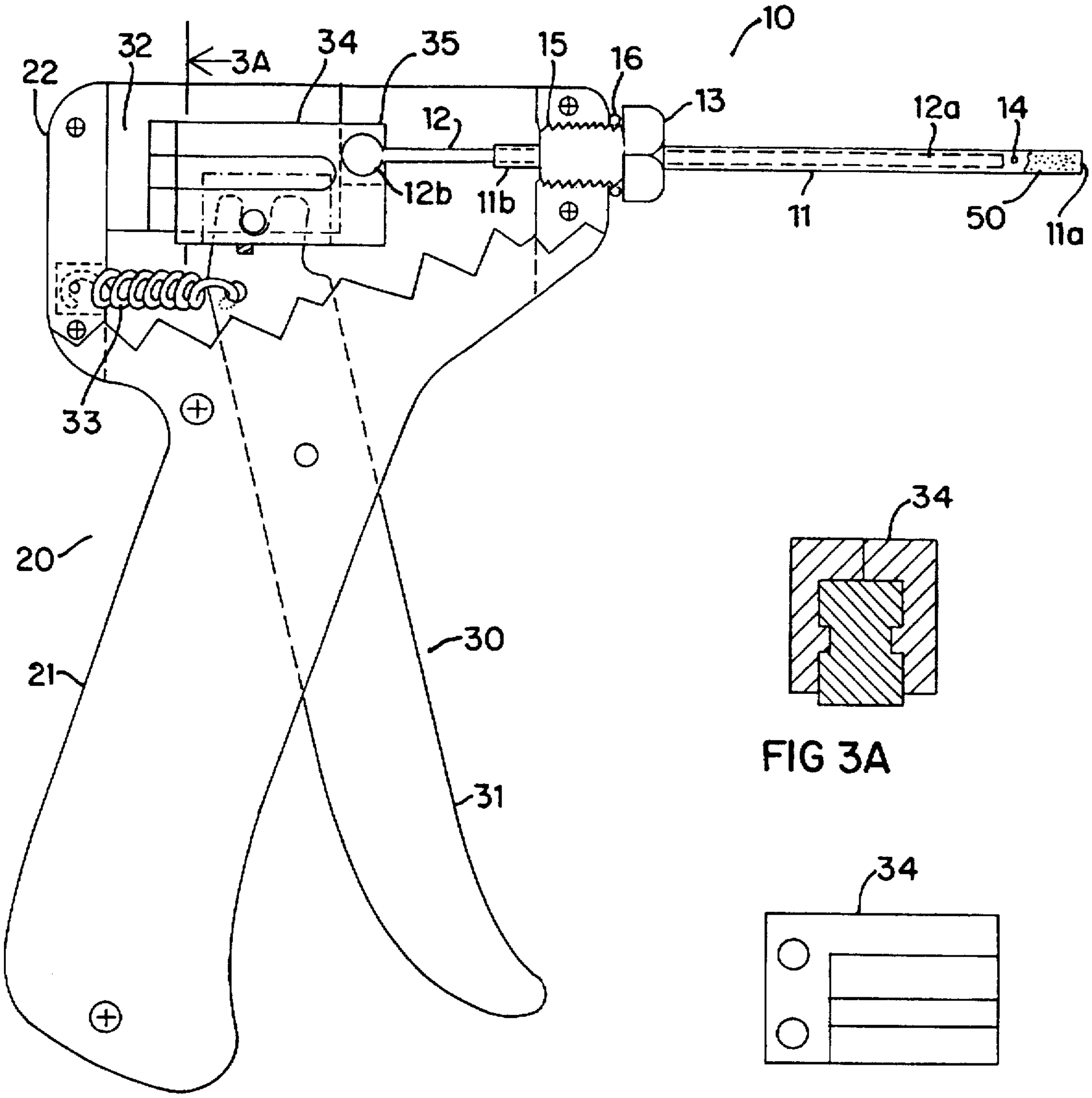
FIG 3A
FIG 2
FIG 3B
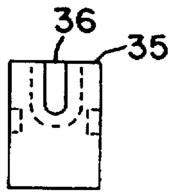
FIG 4A
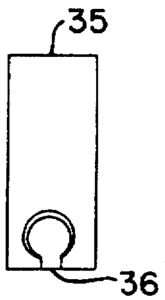
FIG 4B
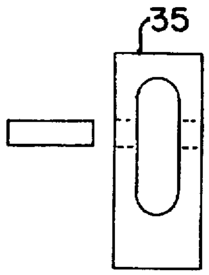
FIG 4C

HOLE-FILLING TOOL

BACKGROUND OF THE INVENTION

1. Field of the Invention

The present invention relates to devices for filling holes in wood surfaces. In particular, the present invention relates to a tool used to fill nail holes of various sizes in fine wood products.

2. Description of the Prior Art

For many years, carpenters have filled imperfections and nail holes in wood products with the fine sanding dust arising from the working of the wood. The fine sanding dust is mixed with an adhesive and thinner to make a moldable filler material that will match the surrounding wood after staining. The thinner may be a solvent or water or the like. The moldable filler material is then inserted into the nail hole or other imperfections and allowed to dry. After it is dry, any excess material is trimmed off and the remaining filler material is sanded smooth so as to match the surrounding wood surface. Since the filler material is made of the same wood, the filled imperfections and nail holes in the finished product are nearly undetectable.

Traditional methods of inserting the sawdust mixture or other filler material into the hole include using fingers, a putty knife, or a similar tool. A disadvantage of these traditional procedures is that the adhesive or glue is inevitably spread into the wood surrounding the hole, with the result that discoloration occurs when stain is later applied. The design and size of these devices make it very difficult to accurately insert the filler material into a small hole or imperfection. A further disadvantage of this method is that the filler material is not adequately pressure-packed into the hole and therefore is more apt to dislodge when later trimming and sanding takes place.

U.S. Pat. No. 5,302,205 (1994, Priddy) teaches the use of a device for guiding a filler material into a nail hole. The Priddy device is a plate containing various-sized holes. When used to fill a nail hole, the plate is aligned with one of its holes over the nail hole, and the filler material is then pushed through the hole in the plate into the nail hole using fingers, a putty knife, or the like. The plate acts as a guide so that the filler material is not placed on the wood surface surrounding the hole to be filled. The filler material is contained within the diameter of the hole by the plate and the surrounding wood surface. The surface of the plate may be flat or curved in order to more closely match the existing wood surface. This device helps the carpenter fill the holes more easily as long as the contour of the wood matches that of the device.

However, this type of device is difficult, or even impossible, to use in situations where the wood surface does not match the surface of the device. Finish carpenters work with many sizes and shapes of molding and other wood pieces, and it would be very expensive to have a separate tool to match every shape. If the surfaces of the device and wood do not match, the filler material can leak out, resulting in the above-described discoloration of the surrounding wood surface. Furthermore, when trying to pack the filler material into the hole using this device, the carpenter must use both hands, one hand to press the device tightly against the wood and the other hand to insert and pack the filler material into the nail hole.

The Priddy device fails to address many of the above-mentioned problems associated with the insertion of the filler material into the holes. While the Priddy device may provide more protection to the surrounding wood surface than nothing at all, that is, where one just uses one's fingers or a putty knife to insert the filler material-it falls far short of adequately shielding the wood surface. In particular, the Priddy device would be impossible to use in small areas, such as an interior corner, where no substantial surface exists. The Priddy device teaches the use of various-sized holes; however, the more holes it contains, the larger the device must be. If the holes are placed too close together in the plate, the filler material will undoubtedly be pushed into them, resulting in the problem the device was intended to avoid. On the other hand, if the device only contains a few plate holes, then the carpenter must purchase multiple devices to have a set of hole sizes corresponding to the many different sizes of finish nails.

U.S. Pat. No. 5,155,965 (1992, Tabei et al.) and U.S. Pat. No. 5,257,486 (1993, Holmwall) teach the use of plunger/piston type devices for repairing cracks in concrete or masonry by boring a hole into the concrete in order to inject a repairing agent deep into the cracks. These devices are designed to inject a liquid that is thin enough to seep into the cracks, but they are not designed to insert thicker materials such as the sawdust mixture that is generally more desirable. Tabei et al. further teaches the use of a mechanism for gradually increasing the injection pressure as the repairing agent is injected into the crack. Holmwall teaches the use of a positioning flange to center the tube in the bored hole. These devices do not address the problem of protecting the surrounding surface from exposure to the repairing agent or putty. The Tabei et al. and Holmwall devices are also designed so that the tip of the device is inserted into the bored hole. While this helps insert the repairing agent deep into the crack-the purpose for such devices-the walls of the tip take up space in the bored hole so that the hole cannot be completely filled with the repairing agent or putty. With concrete this is not usually a problem, but with finished wood products, such a result is clearly unacceptable. Furthermore, both the Tabei et al. device and the Holmwall device fail to teach the use of various-sized bits in order to accommodate the many different finish nail sizes. Other similar plunger/piston or syringe type devices exist, but they also fail to address the noted problems.

What is needed is a device for filling holes in wood while protecting surrounding wood surfaces of widely varying topographies from the hole-filling mixture. What is also needed is such a hole-filling device that can quickly and accurately access holes, including those located in non-planar surfaces and difficult to reach areas. What is further needed is such a device that will compress filler materials of varying viscosities into small holes. What is still further needed is such a device that allows the user to fill the nail holes in the manner suggested above while using only one hand to do so. What is also needed is such a device that can be easily disassembled and cleaned. Finally, what is needed is that such a device be available as a single tool that has various-sized bits to match the head diameters of standard finish nails.

SUMMARY OF THE INVENTION

It is an object of the present invention to provide a device for filling holes in wood, such as nail holes, while protecting the wood surface surrounding those holes. Another object of the present invention is to provide such a device that allows the user to quickly and accurately position the tool over the hole. Another object of the present invention to provide such a device that can be used on various surfaces to fill nail holes. Yet another object of the present invention is to provide such a device that will allow the user to compress a variety of filler materials of varying consistencies into nail holes, while using only one hand to do so, if necessary. A further object of the present invention is to provide such a device that can be easily disassembled and cleaned. Finally, it is an object of this invention to make such a device available as a single tool that has various-sized bits to match the head diameters of standard finish nails.

The hole-filling tool of the present invention achieves the noted objectives by providing a cylinder that has a plunger or piston for discharging and depositing a charge of filler material into a hole. Such filler materials include, but are not be limited to, the above-mentioned sawdust mixture, traditional colored putties, fillers, hard waxes, and other sorts of commercially-available fillers well known to those skilled in that type of fine work. The present invention is designed so that the cylinder sits on the rim of a hole-to-be-filled, with the inner diameter of the cylinder being substantially the same size as the diameter of the hole. This is to ensure that the filler material is adequately packed into the hole so that it will stay in place when later trimming or sanding is done. A carpenter's tool kit would generally contain a set of the hole-filling tool cylinders matching the sizes and diameters of common-sized finish nails.

In use, the hole-filling tool of the present invention is filled with a charge of filler material, such as a moldable wood filler medium, by using a loader that includes an upper reservoir containing the filler material and a lower loading column having an inner diameter matching the outer diameter of the cylinder of the tool. The plunger is inserted into the upper and lower reservoirs forcing the filler material into the cylinder of the tool. A vent hole is provided in the cylinder of the tool to facilitate loading and to ensure proper insertion of the filler material into the hole. The tool is then placed over the hole with the rim of the cylinder resting on the wood surrounding the hole. The plunger or piston is depressed, so as to fill and compact the moldable filler material into the hole. This is accomplished without exposing the wood grain around the hole to a filler material that might otherwise cause problems of discoloration or color differences, when the wood is stained for example.

After the tool is removed, the compacted filler material can expand to overfill the hole without spreading the adhesive onto the surrounding wood. Once dry, the protruding material may be trimmed and sanded smooth, rendering the wood ready-to-finish. It is to be understood that the present invention may be used to fill other holes, imperfections, or the like, in structures made of materials other than wood, and with filler mediums different than those commonly used to fill holes in wood.

One alternative embodiment of the present invention includes a triggering unit to be used in conjunction with the tube and plunger assembly. The tube and plunger assembly is preferably designed to be easily removed in order to clean it or to replace it with a different size. Several sizes of the tube/plunger assembly may be included in a hole-filling tool kit in order to fill various hole sizes. The present invention may also be implemented in a pneumatic auger-fed structure for use in cabinet shops and on assembly lines.

Implicit in the description of the wood-filling tool is a method of filling a hole or imperfection in wood, etc., with a filler material. This method includes isolating the hole from the wood surface by placing a barrier along the perimeter of the hole, inserting a filler material into the barrier, and packing the filler material into the hole. More particularly, this method includes prepacking the filler material into a container that both holds the filler material and protects the wood surface surrounding the hole. Pressure is then applied to the material, forcing it from the container and compacting it into the hole.

As noted, an obvious advantage of the present invention is the ability to protect the surrounding wood surface from a filler material being inserted into a hole such as a nail hole. Another advantage of the present invention is that the device can be used on various surfaces to fill holes. A further advantage of the present invention is that the device allows the carpenter to quickly and accurately position the tool over the nail hole. This is achieved in the present device by using an elongate thin-walled tube. Due to its thin-walled design, a distal end of the tube is easily and accurately placed over the nail hole regardless of the surrounding surface. Yet another advantage of the present invention is that it allows the user to insert and compress filler materials of varying consistencies into nail holes, using only one hand to do so when required. Still a further advantage of the present invention is that it can be easily disassembled and cleaned. Finally, a further advantage is that the device may be a single tool that has various-sized bits to match the diameters of the heads of standard finish nails. These and other advantages of the present invention will become apparent upon review of the drawings, detailed description of the device, and the appended claims.

BRIEF DESCRIPTION OF THE DRAWINGS

FIG. 2 is a detailed cut-away side view of the preferred embodiment of the present invention.

FIG. 3A is a front view of the track housing of the preferred embodiment of the present invention.

FIG. 3B is a side view of the track housing of the preferred embodiment of the present invention.

FIG. 4A is a front view of the plunger housing of the preferred embodiment of the present invention.

FIG. 4B is a top view of the plunger housing of the preferred embodiment of the present invention.

FIG. 4C is a bottom view of the plunger housing of the preferred embodiment of the present invention.

DETAILED DESCRIPTION OF THE PREFERRED EMBODIMENT

Figures 1, 1A:
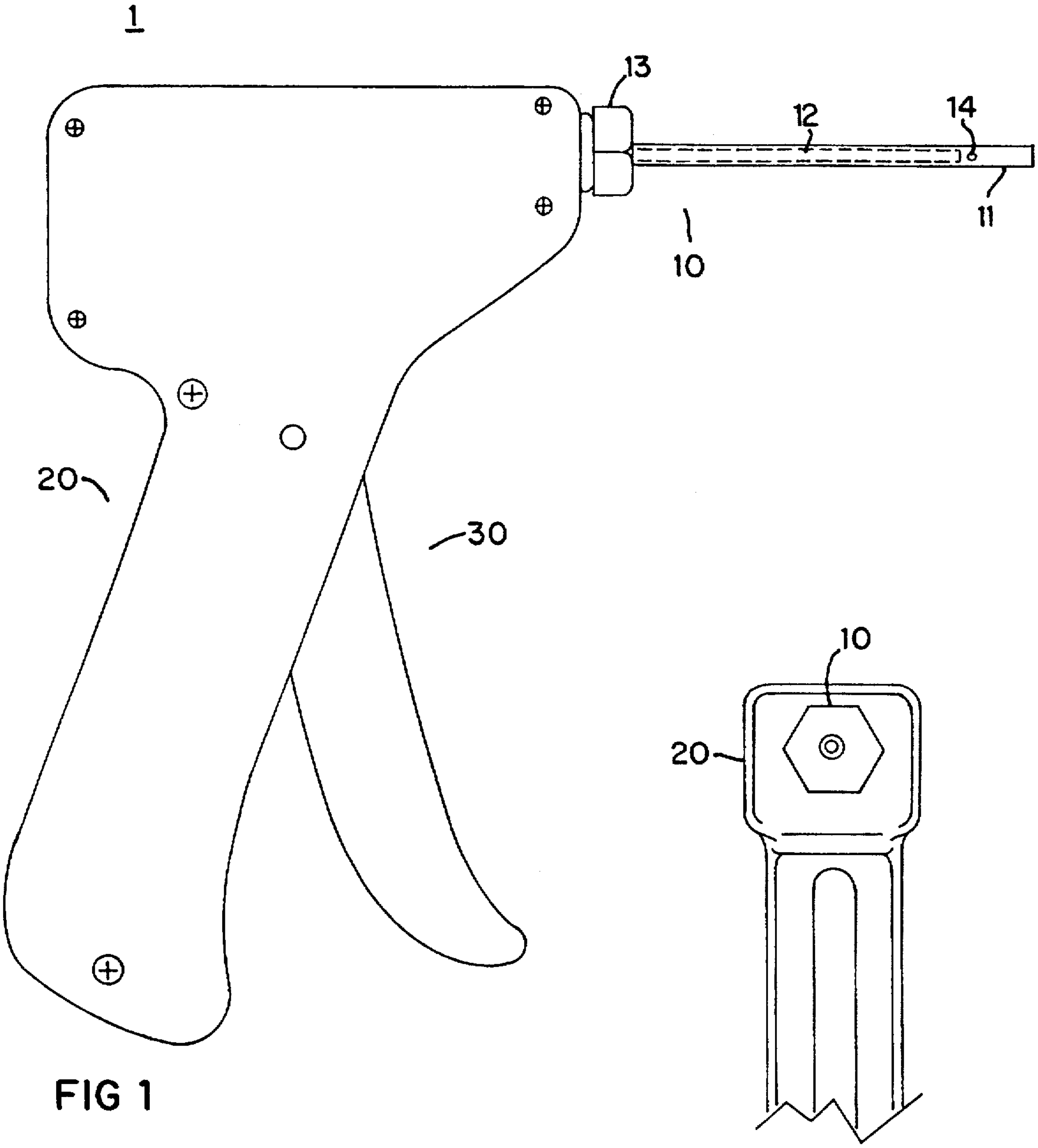
FIG. 1 is a side view of the preferred embodiment of the present invention.
FIG. 1A is a front view of the preferred embodiment of the present invention.

The preferred embodiment of the present invention is illustrated in FIGS. 1–6C. As shown in FIGS. 1–2, a hole-filling tool 1 includes a tip 10, a housing 20, and a trigger mechanism 30. FIG. 1A shows a front view of the preferred embodiment. It is to be understood that all or portions of the hole-filling tool 1 may be made from metals, plastics, or any other material of sufficient structural integrity and compatibility with the material selected for filling the hole.

The tip 10 includes a tube 11, a plunger 12, and a connector 13 for attaching the tip 10 to the housing 20. In the preferred embodiment, an air vent 14 is located about ⅛" from a distal end 11*a* of the tube 11 in order to allow air trapped between the plunger 12 and a charge of moldable filler material 50 to escape while loading or inserting the filler material 50. Toward a proximal end 11*b*, the tube 11 passes through and is fixed to the connector 13. A distal end 12*a* of the plunger 12 enters into the proximal end 11*b* of the tube 11. A proximal end 12*b* of the plunger 12 is preferably spherical and engages the trigger mechanism 30. The connector 13 includes a bolt 15 that connects the tip 10 to the housing 20. The bolt 15 is bored out along its longitudinal axis in order to receive the tube 11 therein. The tube 11 is normally soldered or adhesively connected to the bolt 15. The connector 13 may also include an O-ring 16 or similar washer-type device to keep tip 10 from loosening during use. The O-ring 16 is made of rubber in the preferred embodiment, but it could also be fabricated from similar materials used in common gaskets or washers. The tip 10 may be easily inserted into and retracted from the housing 20 for cleaning or to change sizes of the tube 11 and plunger 12. In the preferred embodiment, the tube 11, the plunger 12, and the bolt 15 are made of stainless steel, but could also be made of other metals, plastics, or the like.

The housing 20 includes a handle 21 and a stock 22. The handle 21 is shaped to fit into a person's hand and may be similar to the various types of common handles used in the hand tool industry. The stock 22 secures the tip 10 to the trigger mechanism 30. In the preferred embodiment, the housing 20 is made of plastic but could also be made of metals or other suitable material.

The trigger mechanism 30 has a lower portion 31 and an upper portion 32. The lower portion 31 is rotatably connected to the handle 21 but could be rotatably connected to the stock 22. As the user squeezes the lower portion 31 toward the handle 21, the lower portion 31 acts as a lever which actuates the upper portion 32 and pushes the plunger 12 into the tube 11. The lower portion 31 is also connected to the rear of the stock 22 by a spring 33 which retracts the lower portion 31 to its normal position after the lower portion 31 is released by the user.

As illustrated in FIGS. 2–4C, the upper portion 32 includes a track housing 34 and a plunger housing 35. The track housing 34 is either secured to or may be part of the stock 22. The plunger housing 35 slidingly engages the track housing 34 as the plunger housing 35 is moved back and forth by the lower portion 31. The plunger housing 35 is rotatably connected to the lower portion 31 and is further connected to the proximal end 12*b* of the plunger 12.

Figure 5:
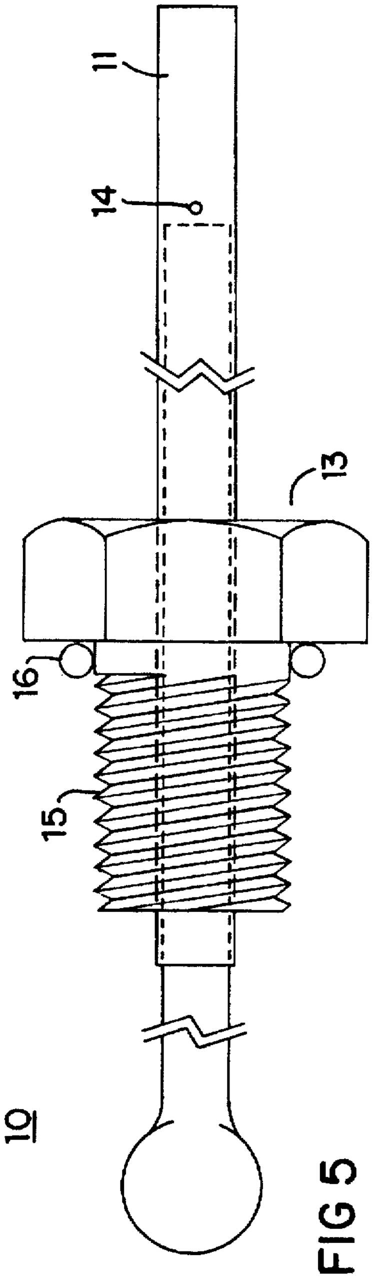
FIG. 5 is a detailed side view of a larger tube/plunger combination of the present invention.
Figure 5A:
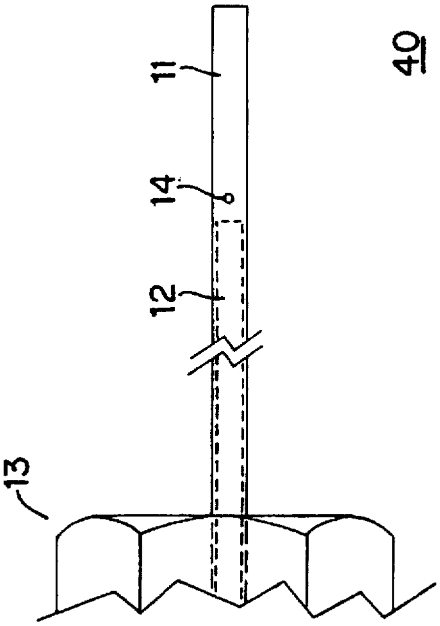
FIG. 5A is a side view of a smaller tube/plunger combination of the present invention.

As shown in detail in FIGS. 5 and 5A, the tip 10 includes varying diameters for the tube 11. FIG. 5 illustrates a larger tube 11 and FIG. 5A illustrates a smaller tube 11. While the diameter of the desired tube size may vary, the bolt 15 should have a common thread diameter in order to universally fit into the stock 22. The tip 10 can be easily removed and cleaned by first rotating the bolt 15. Once the tip 10 is removed, the plunger 12 may then be easily removed by lifting it out of a slot 36 in the plunger housing 35, as shown in FIGS. 4A–4C.

Figure 6B:
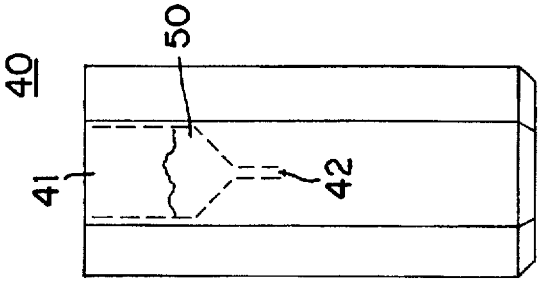
FIG. 6B is a three-dimensional view of a device for loading a smaller tube of the present invention.
Figure 6A:
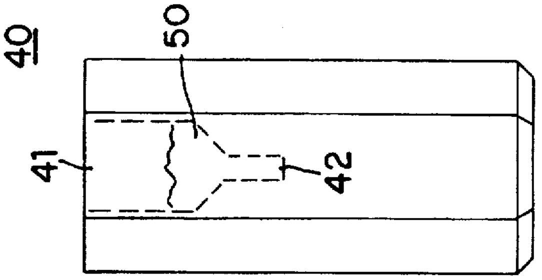
FIG. 6A is a three-dimensional view of a device for loading a larger tube of the present invention.
Figure 6C:
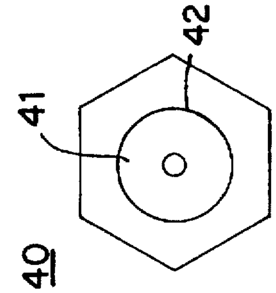
FIG. 6C is a top view of a device for loading the tube of the present invention.

As illustrated in FIGS. 6A, 6B, and 6C, the filling tool 1 may also include a loader 40. The loader 40 has a reservoir 41 that tapers into a column 42. The charge of moldable filler material 50 is placed in the loader 40. The column 42 is cylindrical and in the preferred embodiment is about ⅛" deep. As the tube 11 is pushed into the loader 40, the distal end 11*a* of the tube 11 is easily loaded with the filler material 50. As shown in FIGS. 6A and 6B, the column 42 may vary in size in order to accommodate various-sized tubes 11. FIGS. 6A and 6B show the loader 40 for a larger tube 11 and a smaller tube 11, respectively. FIG. 6C shows the top view of the loader 40.

Figure 7:
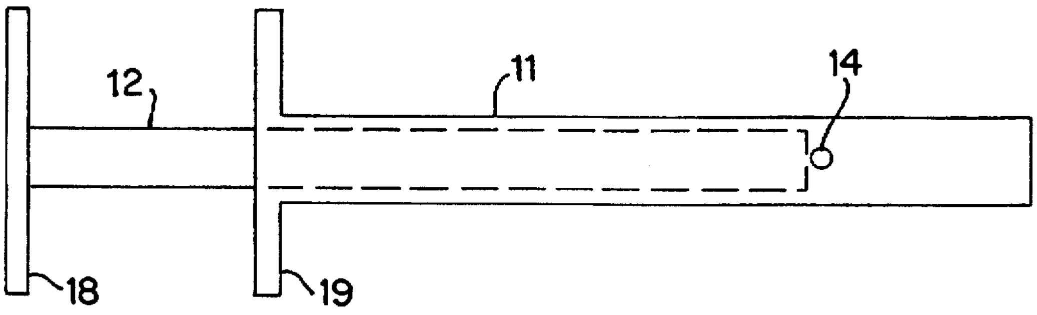
FIG. 7 is a side view of an alternative design of the present invention.

In a simpler alternative embodiment shown in FIG. 7, the plunger 12 may include a modified plunger 18 and a handle 19 to facilitate insertion of the filler material 50 into a hole. An end of the modified plunger 18 may be of an ergonomic design so as to minimize strain on the user, particularly when the device is used over an extended period of time. The handle 19 may be fabricated in a similar manner.

Figure 8:
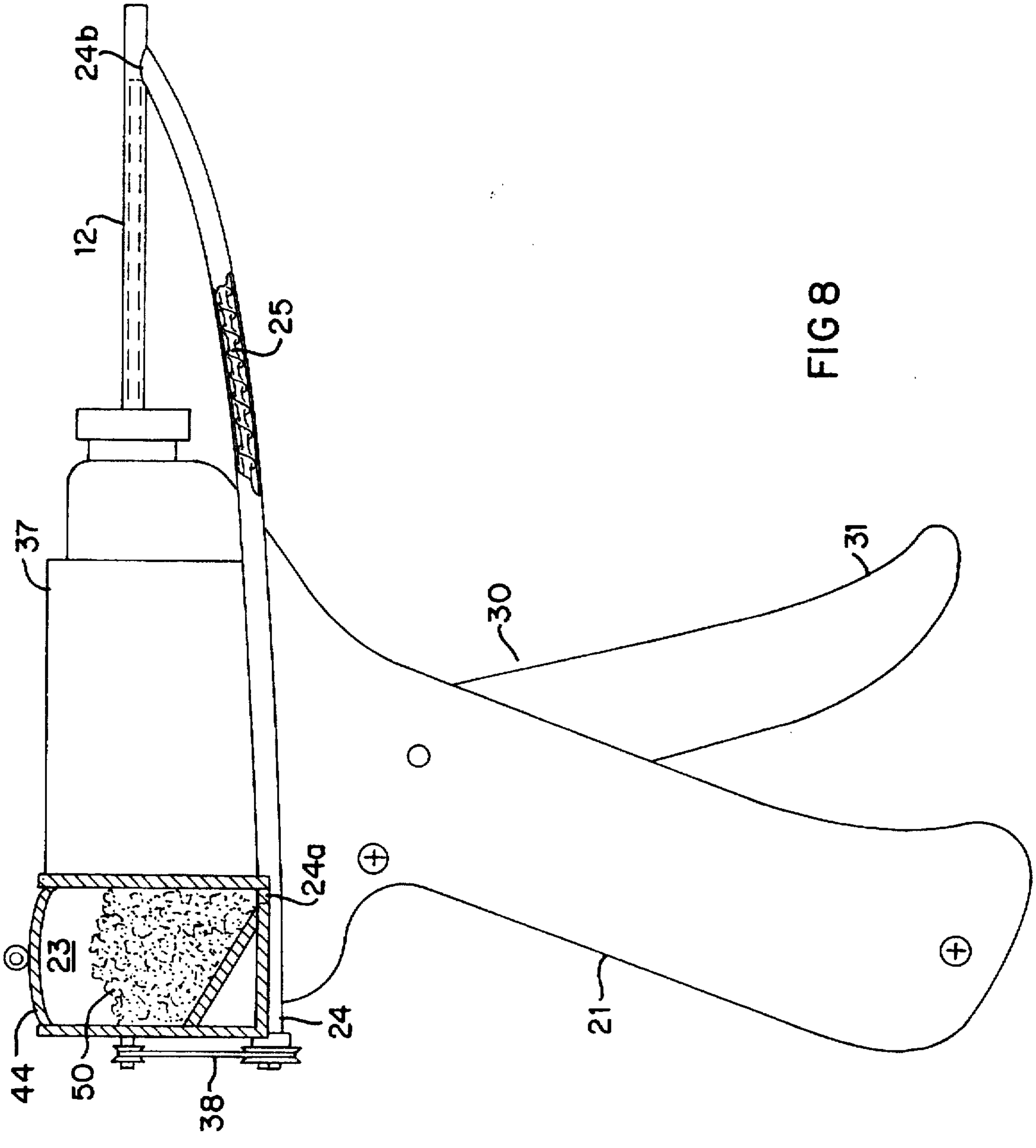
FIG. 8 is a side view of an auger-fed variation on the triggered design of the filler device of the present invention.

In another alternative embodiment shown in FIG. 8, the hole-filling tool 1 includes a reservoir 23, a pneumatic linear actuator 37, and an auger 24. The reservoir 23 and actuator 37 are housed within the stock 22. The reservoir 23 holds the filler material 50. The auger 24 is attached to the stock 22 near the reservoir 23 and also to the tube 11 near the distal end 11*a* in essentially a Y-type fitting. The auger 24 has a reservoir opening 24*a* where the filler material 50 enters the auger 24 from the reservoir 23 and a tube opening 24*b* where the filler material 50 exits the auger 24 and enters the tube 11. The auger 24 further includes an auger bit 25. The auger bit 25 is mechanically coupled to the actuator 37 through a spindle 38 that rotates with movement of the actuator 37. The spindle 38 may be modified to rotate to different positions so as to supply varying amounts of filler material 50 as required for a given hole. The auger bit 25 rotates each time the spindle 38 is moved by a squeezing of the trigger mechanism 30, thereby forcing a predetermined amount of filler material 50 from the auger 24 into the tube 11. It is to be understood that the auger bit 25 enables the user to dispense filler materials of varying viscosities. That is, the auger 24 is designed to provide sufficient force to be able to move materials that are relatively thin as well as materials that are relatively thick. As the auger 24 moves the filler material 50 into the tube 11, a movable plate 44, which may be spring-loaded, moves into the reservoir 23 so as to maintain a constant pressure on the filler material 50.

The preferred embodiment of the present invention has been described herein. Further modification of the invention disclosed will occur to those skilled in the respective arts and all such modifications and equivalents are deemed to be within the scope of the invention as defined by the appended claims.

What is claimed is:

1. A hole-filling tool for filling a hole of specified diameter with a filler material, said hole-filling tool comprising:

a) an elongate tube having a proximal end and a distal end of substantially equal inside dimensions, said elongate tube including an end-section located at said distal end and of like dimension as said distal end, said end-section for holding a charge of said filler material, said end-section having an opening being shaped substantially similar to a perimeter of said hole to be filled in so as to enable visual alignment of said elongate tube over said hole;

b) filler-moving means for moving said filler material out of said end-section, through said elongate tube, and into said hole; and c) a plunger having a proximal end coupled to said filler-moving means, said plunger having a distal end sized to fit within said elongate tube such that said plunger may move within said elongate tube from said proximal end to said distal end of said elongate tube and such that said plunger and said elongate tube are in axial alignment with each other, wherein axial movement of said plunger within said elongate tube causes said distal end of said plunger to displace said filler material and thereby eject said filler material from said end-section of said elongate tube.

2. The hole-filling tool as claimed in claim 1 further comprising operating means for axially moving said plunger within said elongate tube, said operating means comprising finger holders coupled to said elongate tube and a thumb holder coupled to an elongate piston at said proximal end of said plunger for manually pushing said elongate piston relative to said elongate tube and pulling said elongate tube relative to said elongate piston.

3. The hole-filling tool as claimed in claim 1 wherein said elongate tube includes a vent formed in a side of said elongate tube, said vent located at a position adjacent to said end-section and nearer to said proximal end of said elongate tube, said vent enabling excess air between said plunger and said filler material to escape.

4. The hole-filling tool as claimed in claim 1 wherein said filler material includes a mixture of sawdust, thinner, and an adhesive.

5. The hole-filling tool as claimed in claim 1 further comprising operating means for sliding said plunger within said elongate tube, wherein said operating means includes a handle means for holding said elongate tube in axial alignment with said plunger and a trigger means coupled to an elongate piston of said plunger for dispensing said filler material from said elongate tube and packing said filler material into said hole.

6. The hole-filling tool as claimed in claim 5 wherein said filler-moving means further includes auger means coupled to said elongate tube and to an auger-means movement device for actuating said auger means.

7. The hole-filling tool as claimed in claim 6 further comprising an actuator for moving said plunger within said elongate tube, wherein said auger-means movement device is a spindle that rotates with movement of said actuator.

8. The hole-filling tool as claimed in claim 7 wherein said actuator is pneumatically operated.

9. The hole-filling tool as claimed in claim 8 further comprising a filler material reservoir having a movable plate for forcing said filler material into said auger means.

10. The hole-filling tool as claimed in claim 9 wherein a distal end of said auger means forms part of said end-section of said elongate tube.

11. A nail-hole-filling tool for filling a nail hole of specified diameter with a filler material, said nail-hole-filling tool comprising:

a) an elongate thin-walled tube including an end-section for holding said filler material, said end-section having an opening with an inner diameter approximately equal to said specified diameter so that said end-section of said elongate thin-walled tube can rest on a perimeter of said nail hole;

b) a plunger comprising an elongate piston having a diameter constructed so that said elongate piston is slidable within said elongate thin-walled tube for pushing said filler material from said end-section through said opening and into said nail hole;

c) operating means comprising a handle means for holding said elongate thin-walled tube in axial alignment with said plunger and a trigger means coupled to said elongate piston for dispensing said filler material from said end-section through said opening and packing said filler material into said nail hole; and d) a vent formed in a side of said elongate thin-walled tube, said vent being separate from said opening of said end-section and located adjacent to said end-section to allow excess air between said plunger and said filler material to escape.

12. The nail-hole-filling tool as claimed in claim 11 wherein said hole-filling tool is able to be re-filled by means of a filler material loader, said loader having a reservoir and a column containing said filler material, with said reservoir tapering into said column where said column is designed to receive said end-section of said elongate thin-walled tube for packing said filler material into said end-section of said elongate thin-walled tube.

13. The nail-hole-filling tool as claimed in claim 12 wherein said filler material includes a mixture of sawdust, thinner, and an adhesive.

14. A kit for filling a hole with a filler material, said kit comprising:

a) a filler material; and b) a hole-filling tool comprising a plurality of different-sized tips for dispensing said filler material, each of said tips having an elongate tube with a proximal end and a distal end, wherein said distal end of said elongate tube includes an end-section of like dimension as said distal end, said end-section for holding a charge of said filler material, a plunger, and operating means, said elongate tube having an inner diameter approximately the same size as a specified diameter of said hole so that said end-section can rest on a perimeter of said hole; said plunger having a proximal end coupled to said operating means and a distal end sized to fit within said elongate tube such that said plunger may move within said elongate tube from said proximal end to said distal end of said elongate tube and such that said plunger and said elongate tube are in axial alignment with each other, wherein axial movement of said plunder within said elongate tube causes said distal end of said plunger to displace said filler material and thereby eject said filler material from said end-section of said elongate tube; and said operating means comprising a track for holding said elongate tube and said plunger in axial alignment with each other and for sliding said plunger within said elongate tube.

* * * * *